US009076297B2

(12) United States Patent
LeBaron

(10) Patent No.: US 9,076,297 B2
(45) Date of Patent: Jul. 7, 2015

(54) GAMING SYSTEM AND A METHOD OF GAMING

(75) Inventor: Richard G. LeBaron, Las Vegas, NV (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 22 days.

(21) Appl. No.: 13/205,943

(22) Filed: Aug. 9, 2011

(65) Prior Publication Data

US 2012/0071231 A1 Mar. 22, 2012

Related U.S. Application Data

(60) Provisional application No. 61/371,995, filed on Aug. 9, 2010.

(51) Int. Cl.
*G07F 17/32* (2006.01)
*A63F 13/12* (2006.01)

(52) U.S. Cl.
CPC ........ *G07F 17/3258* (2013.01); *G07F 17/3255* (2013.01)

(58) Field of Classification Search
USPC ................................................ 463/25, 26, 29
See application file for complete search history.

(56) References Cited

U.S. PATENT DOCUMENTS 5,916,906 A 6/1999 Shaskan
6,541,836 B2 4/2003 Iwanczyk et al.
8,021,227 B2 * 9/2011 Baerlocher ..................... 463/20
2002/0139970 A1 10/2002 Iwanczyk et al.
2004/0178582 A1 9/2004 Garrod
2005/0023759 A1 2/2005 Chen et al.
2005/0085624 A1 4/2005 Birse
2005/0161884 A1 7/2005 Au-Yeung et al.
2006/0247035 A1 11/2006 Rowe et al.
2006/0264257 A1 11/2006 Jaffe et al.
2007/0173316 A1 7/2007 Cowan et al.
2007/0225065 A1 9/2007 Wright et al.
2008/0311981 A1 12/2008 Schugar
2009/0061999 A1 3/2009 Popovich et al.
2009/0088239 A1 4/2009 Iddings et al.
2009/0111561 A1 * 4/2009 Dewaal et al. .................. 463/20
2009/0124346 A1 * 5/2009 Baerlocher ..................... 463/20
2009/0137316 A1 5/2009 Kim
2010/0041470 A1 * 2/2010 Preisach ......................... 463/25
2011/0112764 A1 * 5/2011 Trum ............................ 701/213
2011/0244944 A1 * 10/2011 Baerlocher ..................... 463/20

FOREIGN PATENT DOCUMENTS

CN 2784048 Y 5/2006
EP 677311 A2 10/1995
EP 677311 A3 11/1995
GB 2464332 A 4/2010
JP 5820990 A 12/1983
JP 59106296 A 6/1984
JP 61074596 A 4/1986

(Continued)

*Primary Examiner* — Pierre E Elisca
(74) *Attorney, Agent, or Firm* — McAndrews, Held & Malloy, Ltd.

(57) ABSTRACT

A method of gaming comprising: determining a wagering threshold to apply to play of at least one gaming device during a current gaming session based on an amount wagered in at least one prior gaming session; and triggering an event upon reaching the wagering threshold in the current gaming session.

34 Claims, 8 Drawing Sheets

(56) References Cited

FOREIGN PATENT DOCUMENTS

| | | | |
|---|---|---|---|
| JP | 3246222 | A | 11/1991 |
| JP | 4026837 | B | 5/1992 |
| JP | 1737603 | C | 2/1993 |
| JP | 6153220 | A | 5/1994 |
| JP | 3447760 | B2 | 9/2003 |
| JP | 2004135910 | A | 5/2004 |
| JP | 3534344 | B1 | 6/2004 |
| JP | 2004174034 | A | 6/2004 |
| JP | 2004290537 | A | 10/2004 |
| JP | 2005143787 | A | 6/2005 |
| JP | 2005176912 | A | 7/2005 |
| JP | 3699080 | B2 | 9/2005 |
| JP | 2005348830 | A | 12/2005 |
| JP | 2006034860 | A | 2/2006 |
| JP | 2006068120 | A | 3/2006 |
| JP | 2006175257 | A | 7/2006 |
| JP | 2006175258 | A | 7/2006 |
| JP | 3848320 | B2 | 11/2006 |
| JP | 2007275435 | A | 10/2007 |
| JP | 2008132223 | A | 6/2008 |
| JP | 2008264452 | A | 11/2008 |
| JP | 4231395 | B2 | 2/2009 |
| JP | 4293461 | B2 | 7/2009 |
| JP | 4293462 | B2 | 7/2009 |
| JP | 2009165877 | A | 7/2009 |
| KR | 20040088736 | A | 10/2004 |
| WO | 2008060812 | A2 | 5/2008 |
| WO | 2008060812 | A3 | 5/2008 |

* cited by examiner

GAMING SYSTEM AND A METHOD OF GAMING

RELATED APPLICATIONS

This application is a non-provisional of U.S. Application No. 61/371,995, entitled “A Gaming System and a Method of Gaming,” having a filing date of Aug. 9, 2010, which is incorporated herein by reference in its entirety.

BACKGROUND OF THE INVENTION

The present invention relates to a gaming system and a method of gaming.

Gaming venues use electronic bonusing systems to provide bonuses at individual gaming machines based on the amount of credit input to a gaming machine. Similarly, player tracking systems are used to track players and to provide them with loyalty points which can be redeemed for rewards based on their amount of play.

There is a need for other techniques for providing benefits to players.

BRIEF SUMMARY OF THE INVENTION

In a first aspect, the invention provides a method of gaming comprising:

determining a wagering threshold to apply to play of at least one gaming device during a current gaming session based on an amount wagered in at least one prior gaming session; and triggering an event upon reaching the wagering threshold in the current gaming session.

In an embodiment, the method comprises determining the wagering threshold as a percentage of the amount wagered.

In an embodiment, the method comprises further determining the wagering threshold based on a return to player of the gaming device.

In an embodiment, the method comprises determining a plurality of different wagering thresholds to apply to a current gaming session, each wagering threshold based on a different return to player.

In an embodiment, the different wagering thresholds correspond to a plurality of different ranges of return to player.

In an embodiment, each wagering threshold is a different percentage of the amount wagered in a prior game round.

In an embodiment, the method comprises determining the wagering threshold from an amount wagered in a plurality of prior wagering gaming sessions.

In an embodiment, the wagering threshold is determined based on an average amount wagered.

In an embodiment, the wagering threshold is determined based on gaming sessions within a defined period.

In an embodiment, the wagering threshold is determined based on a defined number of gaming sessions.

In an embodiment, the method comprises determining the wagering threshold from an amount wagered by an individual player.

In an embodiment, the method comprises obtaining an identity of a player of a current gaming session and determining the wagering threshold based on the identity.

In an embodiment, the method comprises determining the wagering threshold from an amount wagered by a group of players.

In an embodiment, the method comprises determining the wagering threshold from an amount wagered on an individual gaming device.

In an embodiment, the method comprises determining the wagering threshold from an amount wagered on a group of gaming devices.

In an embodiment, the event comprises conferring a benefit on the player of the gaming device.

In an embodiment, the event comprises making an award to a player of the gaming device.

In an embodiment, the event comprises providing information to the player of the gaming device.

In a second aspect, the invention provides a method of gaming comprising:

storing data indicative of an amount wagered in at least one prior gaming session in a database;

determining a wagering threshold to apply during play of at least one gaming device in a current gaming session based on the amount wagered in the at least one prior gaming session;

monitoring the wagering threshold for the current gaming session; and triggering an event upon reaching the wagering threshold in the current gaming session.

In a third aspect, the invention provides a gaming system comprising:

a wagering threshold determiner arranged to determine a wagering threshold to apply to play of at least one gaming device during a current gaming session based on an amount wagered in at least one prior gaming session; and an event controller arranged to trigger an event the current gaming session upon the wagering threshold being reached in the current gaming session.

In an embodiment, the wagering threshold determiner determines the wagering threshold as a percentage of the amount wagered in the at least one prior gaming session.

In an embodiment, the wagering threshold determiner determines the wagering threshold based on a return to player of the gaming device.

In an embodiment, the wagering threshold determiner determines a plurality of different wagering thresholds to apply to a current gaming session, each wagering threshold based on a different return to player.

In an embodiment, the different wagering thresholds correspond to a plurality of different ranges of return to player.

In an embodiment, the wagering threshold is a different percentage of the amount wagered in a prior game round.

In an embodiment, the wagering threshold determiner determines the wagering threshold from an amount wagered in a plurality of prior wagering gaming sessions.

In an embodiment, the wagering threshold is determined based on an average amount wagered.

In an embodiment, wagering threshold is determined based on gaming sessions within a defined period.

In an embodiment, wagering threshold is determined based on a defined number of gaming sessions.

In an embodiment, the wagering threshold determiner determines the wagering threshold from an amount wagered by an individual player.

In an embodiment, the gaming system is arranged to obtain an identity of a player of a current gaming session and determine the wagering threshold based on the identity.

In an embodiment, the wagering threshold determiner determines the wagering threshold from an amount wagered by a group of players.

In an embodiment, the wagering threshold determiner determines the wagering threshold from an amount wagered on an individual gaming device.

In an embodiment, the wagering threshold determiner determines the wagering threshold from an amount wagered on a group of gaming devices.

In an embodiment, the event comprises conferring a benefit on the player of the gaming device.

In an embodiment, the event comprises making an award to a player of the gaming device.

In an embodiment, the event comprises providing information to the player of the gaming device.

In a fourth aspect, the invention provides a gaming device comprising:

a wagering threshold monitor arranged to monitor a wagering threshold which applies to a current gaming session, the wagering threshold derived from an amount wagered in at least one prior gaming session; and an event controller arranged to trigger an event the current gaming session upon the wagering threshold being reached in the current gaming session.

In a fifth aspect, the invention provides a gaming management system comprising:

a database storing data indicative of an amount wagered in at least one prior gaming session;

a wagering threshold determiner arranged to determine a wagering threshold to apply in respect of play of at least one gaming device from the amount wagered in the at least one prior gaming session; and a wagering threshold monitor arranged to monitor the wagering threshold for a current gaming session and initiate an event in respect of the at least one gaming device upon the wagering threshold being reached.

The invention also provides computer program code which when executed implements the above method.

The invention also provides a tangible computer readable medium comprising the computer program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Overview of Gaming System

Figure 1:
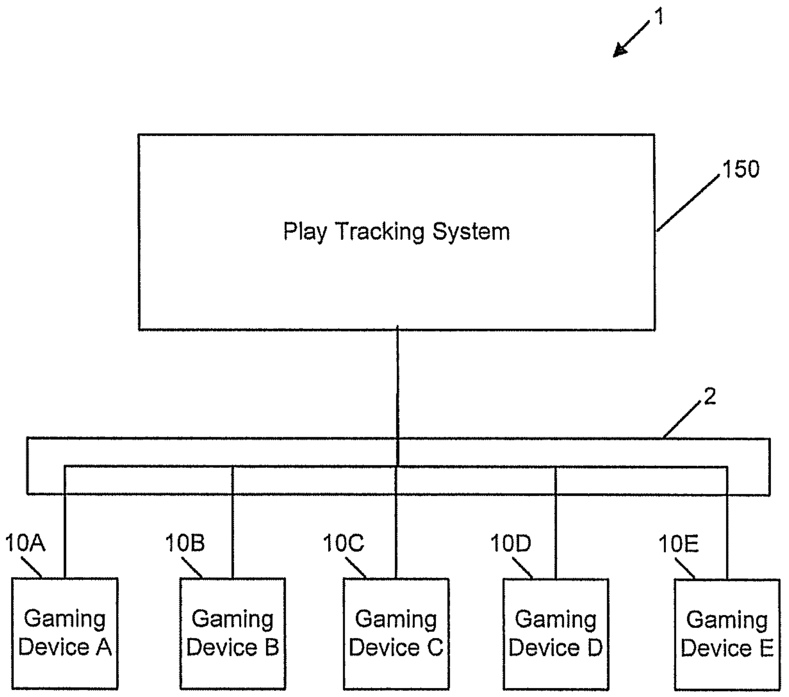
FIG. 1 is a block diagram of a gaming system with a linked game controller.

FIG. 1 shows a gaming system 1 where a play tracking system 150 is in data communication over a network 2, such as an Ethernet, with a bank of five gaming devices in the form of standalone gaming machines 10. The play tracking system 150 is arranged to monitor play of gaming devices by players and to determine whether a wagering threshold has been met in a gaming session. Upon the wagering threshold being met, an event is triggered such as a bonusing or marketing event. For example, a benefit, an award or information may be provided. Depending on the embodiment, the gaming session may be in respect of an individual player, a group of players, an individual gaming device or a group of gaming devices. Advantageously the wagering threshold is based on an amount wagered in at least one prior gaming session. In the case of an individual player, the wagering threshold may be a defined percentage of the player's average daily play. In an advantageous embodiment, the percentage is less than, but close to, 100% such that the event is triggered as the player gets close to the player's average daily play amount.

Gaming Devices

Gaming devices capable of participating in the method of gaming of the embodiment can take any suitable form including stand alone gaming machines and server based gaming terminals.

Figure 2:
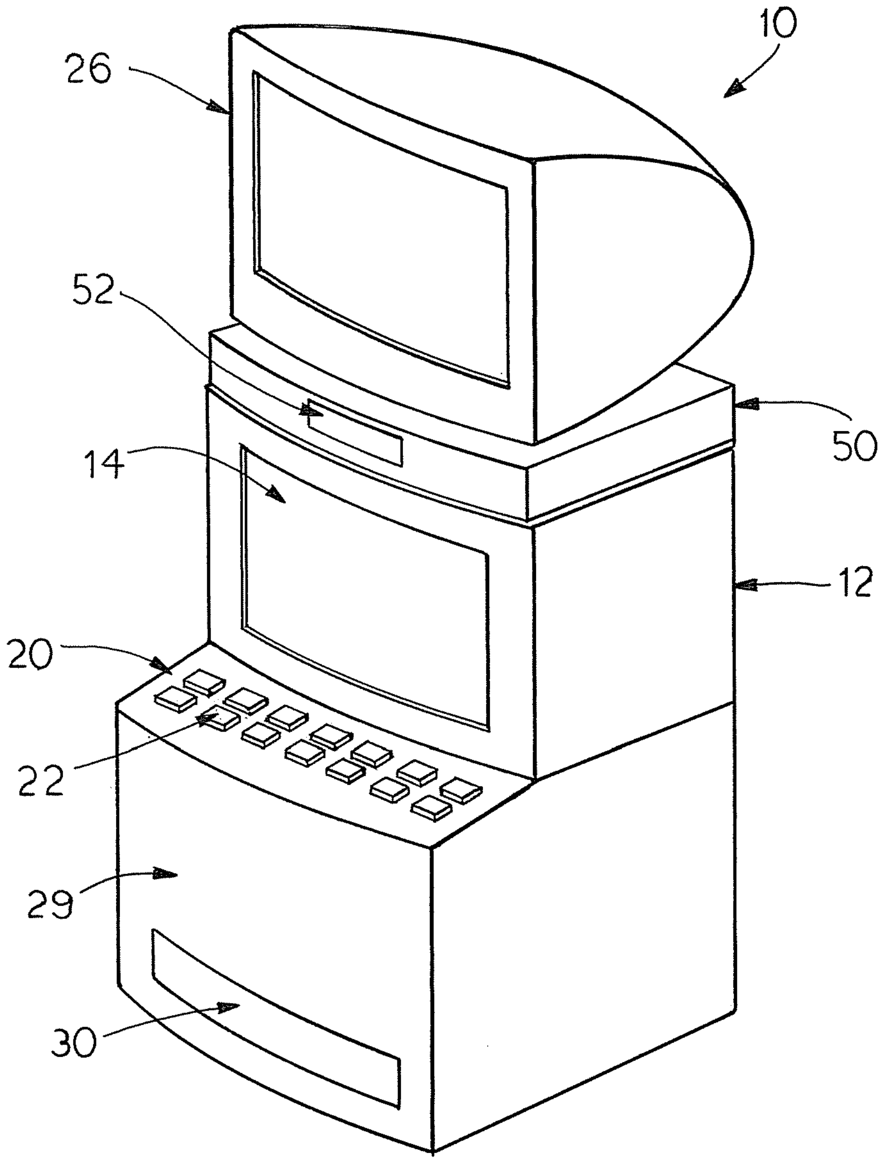
FIG. 2 is a perspective view of a standalone gaming machine.

A gaming device in the form of a gaming machine 10 is illustrated in FIG. 2. The gaming machine 10 includes a console 12 having a display 14 on which are displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism 24 (not shown) which may be, for example a coin input chute and/or a bill collector. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module 50 having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module. Typically the player marketing module also has a display 52 for displaying information to the player.

Artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 also includes a video display unit, which may be of the same type as the display 14, or of a different type.

Figure 3:
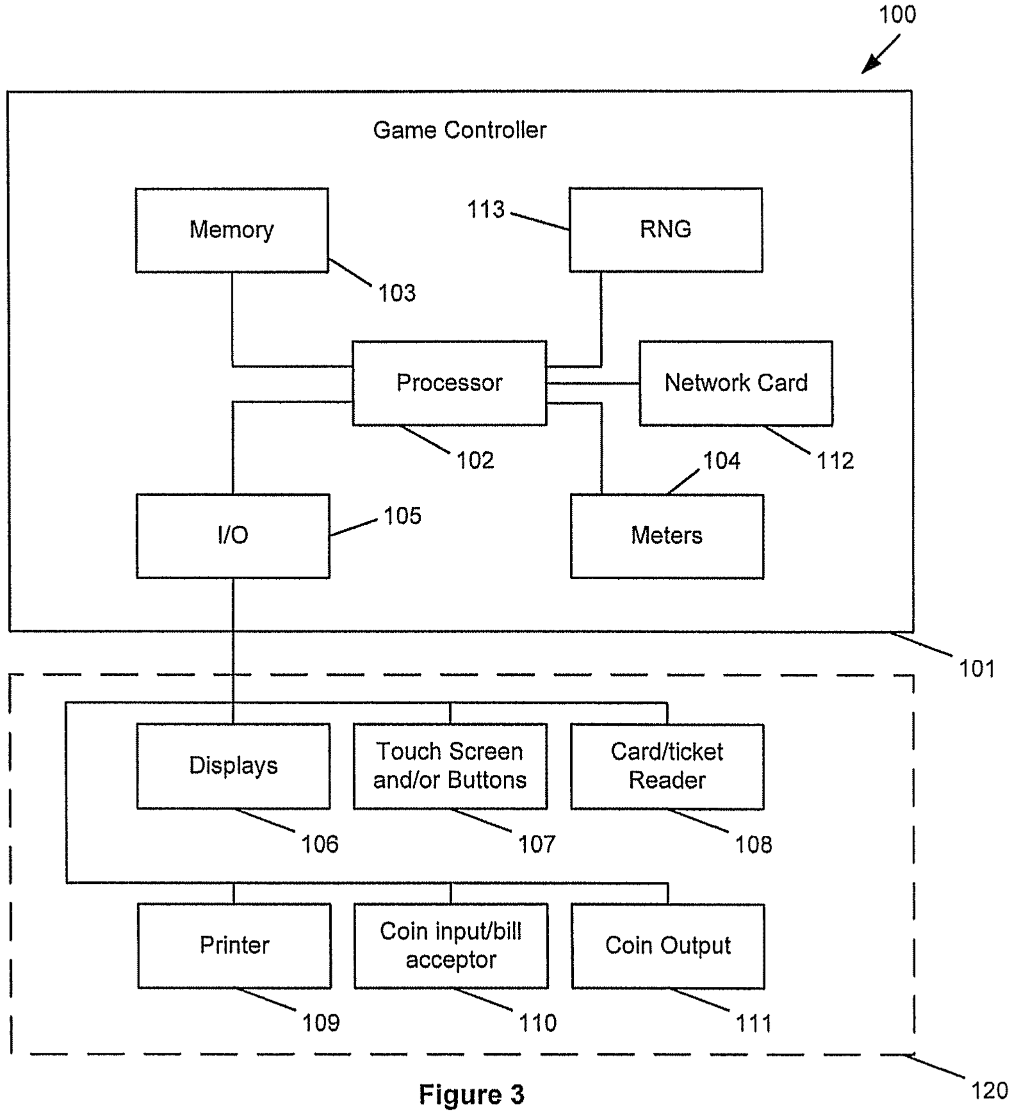
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. In one embodiment, the card reader 108 could be the card reader of a player marketing module 50 and hence connected indirectly to the gaming machine by means of the player marketing module being connected to the gaming machine. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
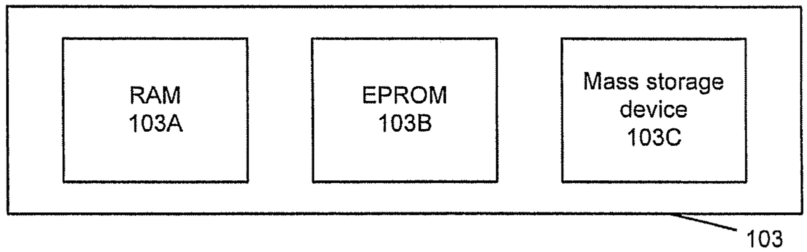
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference. In such an embodiment, a play tracking system can be provided, for example, by a dedicated server in data communication with the game server.

Figure 5:
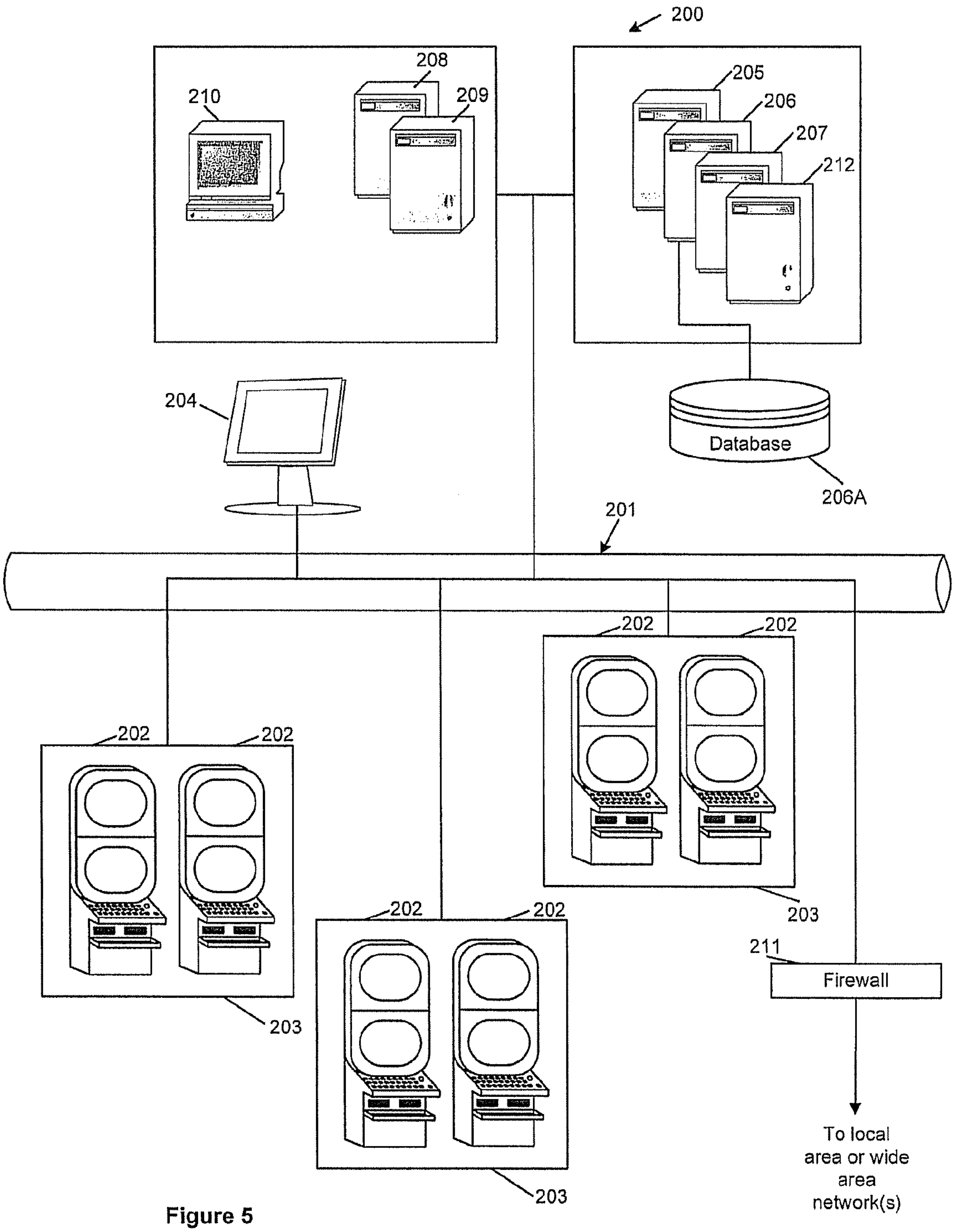
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

A play tracking system can be provided within such a network 200 by play tracking server 205.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single “engine” on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Figure 6:
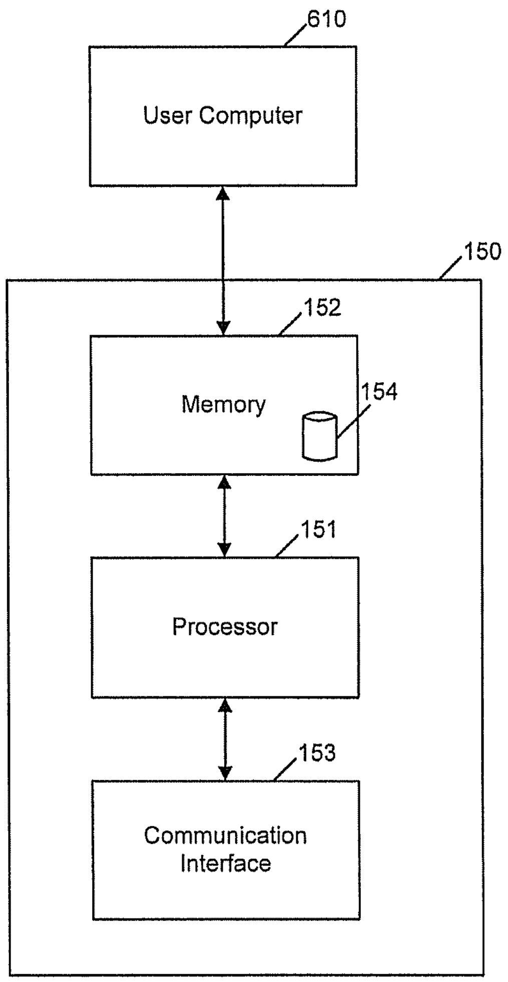
FIG. 6 is a block diagram of a linked game controller.

Referring to FIG. 6, there are shown the components of a play tracking system 150. The play tracking system is in the form of a computer server and comprises a processor 151 for implementing the play tracking system based on computer program code stored in memory 152 and for communicating with the gaming devices 10 via a communication interface 153. A user computer 610 is used to configure the player tracking system as described in further detail below. The memory also includes a play tracking database 154 which can store data regarding prior gaming sessions.

In the embodiment, the play tracking system 150 is arranged to define and monitor wagering thresholds during wagering sessions. The play tracking system is also arranged to control the provision of an event to one or more players once the wagering threshold has been met. The event, may be, for example, a bonusing event such as conferring a benefit on the player(s) or making an award to player(s) or may be a marketing event such as providing information to the player.

Figure 7:
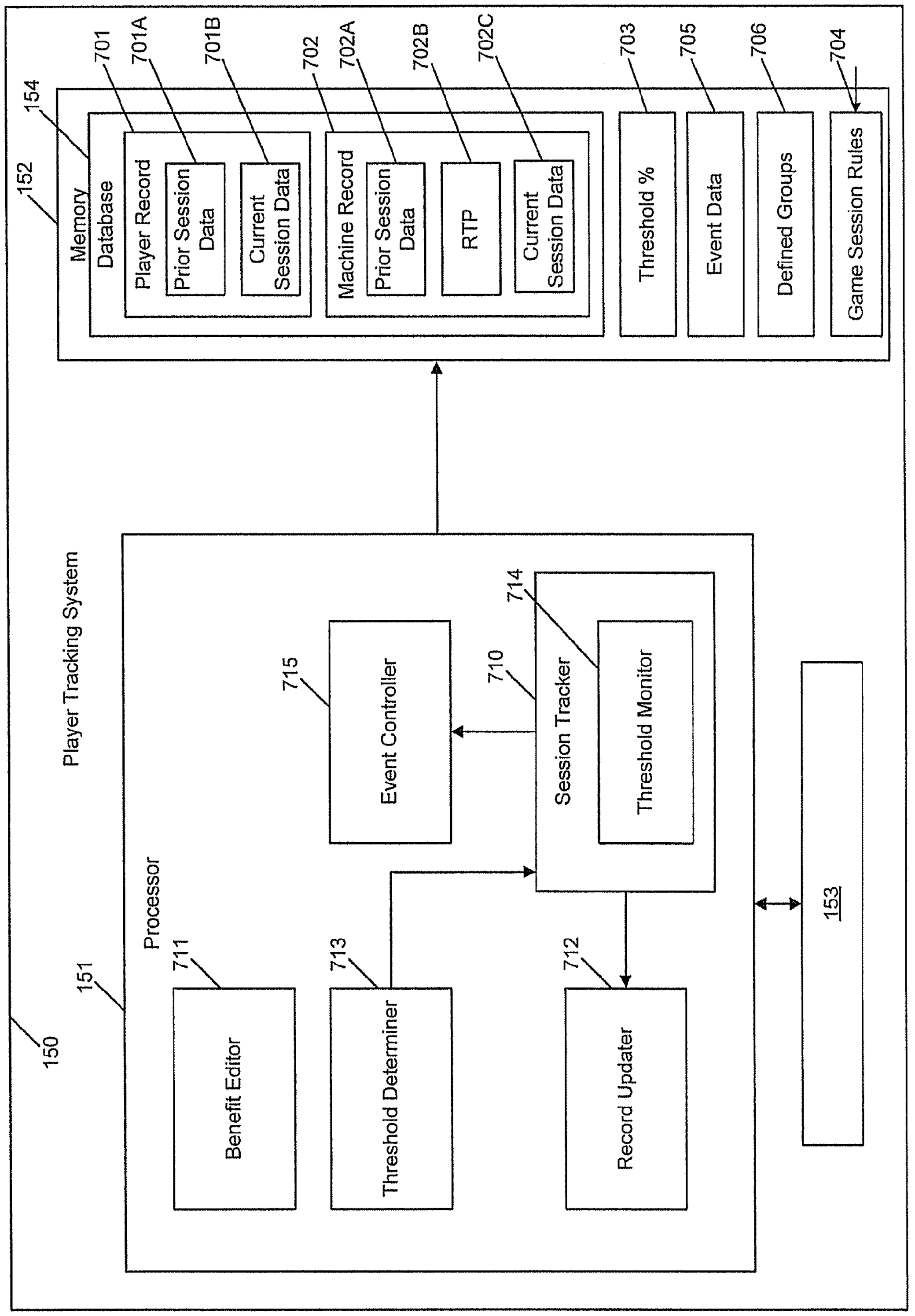
FIG. 7 is a functional block diagram of a linked game controller.

Referring to FIG. 7, there is shown an exemplary functional block diagram of a play tracking system 150 where wagering thresholds can be implemented in respect of individual players, groups of players, individual machines or groups of machines or a combination thereof depending on how the system is configured by the venue.

Game session rules 704 define what is considered to be a game session such that average amounts of wagered in a game session can be calculated. The gaming session rules 704 may be predefined or may be configurable by the venue operator depending on the implementation. In one example, a wagering session is a defined 24 hour period, for example starting at midday of a particular day. In this way, if a player plays past midnight (as is reasonable common) this will be treated as part of a single gaming session for the purpose of the system. In another embodiment, game sessions may be defined by a period of continuous activity. For example, a game session may be considered over, if a player has not played a gaming machine for more than 3 hours or some other defined time periods.

Figure 8:
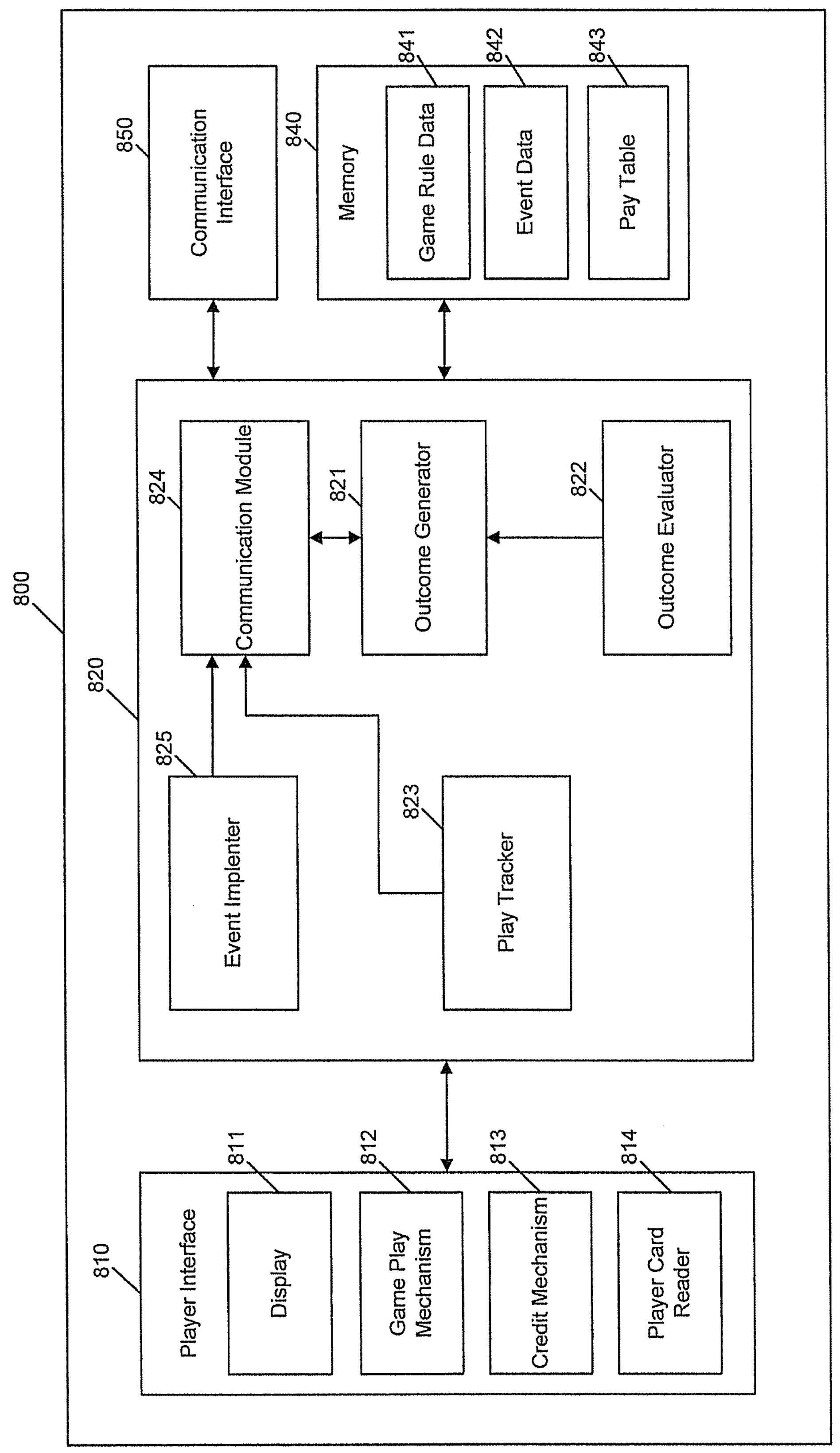
FIG. 8 is a flow chart of an embodiment.

FIG. 8 shows that the gaming devices 800 are arranged to communicate data to the play tracking system. However, data for the play tracking system may be gathered in analogous manner to how data gathered in current player tracking systems based on data communicated from a player tracking module 50 over a network to the play tracking system. Alternatively, rather than the play tracking system 150 communicating directly with the gaming devices 800, it could be interfaced with an existing player tracking system (such as a system marketed under the name Sentinel by Aristocrat Leisure Industries Pty Ltd) and use the data provided to the play tracking system in order to carry out its function.

In any event, the play tracking system receives data via a communication interface 153. The play tracking system has a record updater 712 which updates records for individual players and/or machines stored in database 154. In this respect, the play tracking system also includes a session tracker 710 which determines whether the session is current based on game session rules 704. It tracks the session until it determines that the current session is complete. When the session tracker 710 determines that a session is complete it provides data of the current session to the record updater 712.

The record updater 712 updates the player record such that the current session is now included as a prior session in prior session data 701A of the player record for the particular player 701. (A similar function is performed in relation to the prior session data 702A of the individual machine data 702.) The threshold determiner 713 then determines wager thresholds 701, 702B, which are to apply in a subsequent session. In the embodiment, the thresholds are determined based on the player's average daily play amount and the RTP of the gaming device being played. The average amount is the amount that the player wagers on average in each individual gaming session or is otherwise calculated from past wagering sessions as the amount that the player can be expected to wager (for example, the median amount or an average after statistical outliers have been discarded). The average can be calculated over a defined number of wagering sessions or a defined period such as 60 or 90 days. Alternatively, it can be calculated over all recorded wagering sessions. It is generally advantageous that it be averaged over recent sessions in order that it provide an accurate picture of the user's current spending habits. In the case of a gaming device it is advantageous that it is calculated as a daily average.

However, the threshold may be determined based on other factors such as the average spend for a particular time of year.

In addition to the prior gaming session data, in the embodiment, the wagering threshold also depends to the return to player of the gaming device such that different wagering thresholds apply depending on the return to player of the gaming device. The wagering thresholds are expressed as percentages of the amount calculated from the prior gaming session data. For example, a wagering threshold of X % of the average daily play (ADP) for gaming devices having a RTP in the range of A to B and a wagering threshold of Y % of ADP for the range of B to C, where C>B and Y>X. Advantageously, the percentages are close to but less than 100% such that the event is triggered close to but just before the ADP is reached and hence, near to the anticipated end of the wagering session.

In this respect, the thresholds which apply for RTP ranges are stored in a threshold percentage look up table 703 in memory 152 and are editable by the benefit editor 711 which is accessible by user computer 610. The benefit editor 711 provides a graphical user interface displaying the values of threshold percentages and the RTP ranges. The benefit editor can also be used to define groups of players or machines 706. The benefit editor 711 provides a graphical user interface showing the entries in a database and allows the user to change the parameters. As indicated above, typically, there will be a plurality of different threshold percentages 703 associated with different RTP ranges. The triggered event may encourage one or more players to extend their wagering session. In this respect, session tracker 710 is arranged to accrue data for subsequent analysis so that it is possible to determine whether the player has extended their gaming session based on the event.

Groups 706 can be defined in order to link a plurality of players or a plurality of machines. For example, gaming machines of a specific type or in a particular location within the venue are grouped together.

Accordingly, when a new gaming session is started, the session tracker 710 starts monitoring play by the player(s) or of the gaming devices(s) and cause record updater 712 to begin to update date in current session wagering data for the player 701B or the gaming machine 702C.

The session tracker 713 also advises threshold determiner 713 that a new session has begun so that the threshold determiner 713 can determine the threshold to apply to the current wagering session.

If the wagering threshold is set in respect of the gaming machine, the threshold determiner 713 obtains the RTP 702B of the gaming device and looks up the threshold percentage from threshold percentage look up table 703. The threshold determiner then applies the relevant percentage to the ADP stored with prior session data 702A to determine the wagering threshold and informs the threshold monitor 714.

If the wagering threshold is set in respect of the player, the threshold determiner 713, obtains the RTP 702B of the gaming device being played by the player and looks up the threshold percentage from threshold percentage look up table 703. The threshold determiner then applies the relevant percentage to the ADP stored with prior session data 701A of the player to determine the wagering threshold and informs the threshold monitor 714. Should the player change to a gaming device having a different RTP within the wagering session, threshold determiner calculates a new wagering threshold to be monitored.

When a group is defined 706, in one embodiment this can be to specify eligibility for the wagering threshold such that wagering thresholds are only calculated for players/gaming devices within the defined groups but otherwise the thresholds are determined as described above.

In another embodiment, the groups are defined such that the wagering threshold can be determined based on prior session data of all members of the group. For example, as the average of the ADP of all players in the group. In this embodiments, the threshold determiner, determines the identity of the group and determines the prior session data of each group member from player or machine records 701,702. A relevant threshold percentage is then applied at the gaming device level.

The threshold monitor 714 of the session tracker determines whether the player has reached one of the defined thresholds. Upon a defined threshold being reached the threshold monitor 714 advises the controller 715 which caused the implementation of the configured event stored as event data 705. While the event controller 715 could implement the event itself, for example, by providing an award to be stored in the player record 701, in the embodiment, the event controller 715 communicates with the individual gaming devices 10,800 communication interface 153 in order cause it to implement the event. In other embodiments, the event controller 715 communicates with player marketing module (PMM) 50 of the individual gaming device 10 and the PMM implements the event.

In this respect, referring to FIG. 8, a functional block diagram of a gaming device is shown 800 which can be the same or different to gaming machines 10, 100 shown in FIGS. 2 and 3. The gaming device 800 has a communication interface 850 for receiving data from the play tracking system. The communications module 824 handles all communication. Upon receipt of data indicating that an event should be implemented, the communication module 824 advises the event implementer 825. In the embodiment the defined event is stored as event data 842 at the gaming device such that the event implementer can implement the event at an appropriate time in game play. For example, if the award is a multiplier to apply to a next winning outcome, event implementer advise player on display 811 that such a multiplier will apply and when outcome generator generates a game outcome 821 based on game rules 841 that is evaluated by outcome evaluator as corresponding to a winning outcome in pay table 843, event implementer applies the multiplier.

It will be apparent from FIG. 8 that the gaming device 800 also includes a play tracker 823 which communicates via the communication module 824 and communication interface 850 with the play tracking system 150. It will apparent that this communication can be provided by a player marketing module 50 in other embodiments.

The gaming device 800 also has a player interface 810 including features such as described in relation to FIGS. 2 to 4 allowing the player to interact with the gaming system and including display 811 for displaying game outcomes and game play mechanism 812 for enabling the player to input game play instructions. The game play mechanism 812 includes at least one or more input devices in the form of a touch screen and/or buttons to allow the player to place wagers on the game. The player interface includes other mechanisms such a credit mechanism 813 to allow the player to establish credits in the gaming device. Alternatively, credits may be downloaded from a player card or a player record associated with the card based on the insertion of the player card in the player card reader 814. The insertion of the player card and the player card reader 814 also allows the player identity to be obtained and communicated to the play tracking system 150 such that it can look up the appropriate player record in the play tracking database 154. In embodiments where the wagering thresholds is applied in relation to gaming devices, identification of the gaming device can be stored in memory 840 and be communicated in a similar manner.

Subsequent to the wagering threshold being reached and the event being triggered, play tracker 823 continues to provide information regarding wagers made by the player via the communication module 824 and communication interface 850 to the play tracking system 150 where the session tracker 710 continues to track the gaming session for the player.

In the embodiment, if a player switches gaming devices, the insertion of a player card into the card reader 814 of a new gaming device 800 triggers a communication via the communication module 824 and communication interface 850 to the play tracking system 150 where the session tracker 710 determines whether this is a continuation of a prior session or a new session, and upon it being a continuation of a session determines a new wagering threshold based on the RTP of the new device so that this threshold can be monitored.

As indicated above, the size of the wagering threshold may depend on the return to player of the machine, such that the thresholds may be machine specific. For example, the wagering threshold may be set to 97.5% of a player's average daily play over the past 90 days, for gaming devices having an RTP in the range of 96.5% to 99.9% and a wagering threshold of 96% of ADP may apply to gaming devices having a return to play in the range of 92.5% to 96.49%.

Depending on the embodiment, the venue operator may be provided with a number of options, for example, they may be allowed to specify the number of days used to calculate the average daily play amount (also known as the average daily theoretical). They may also be able to determine the number of different thresholds and the values of individual thresholds. For example, in one example the first threshold of 95% of ADP will apply to RTPs in a range from 86% to 89.99%. The second threshold of 96.5% will apply to RTPs in a range of 90% to 93.9%. A third threshold of 97% will apply to RTPs in a range of 94% to 97.49% and a threshold value of 98% will apply to RTPs in a range from 97.5% to 99.9%.

The same structure of incremental thresholds can be applied to gaming machines based on the average daily theoretical of those machines, however in such embodiments it is typically that the historical number of days is used rather than the number of visits as it is assumed that the gaming machines are played every day.

In another example, a trigger threshold of 97.75% will apply to RTPs in a range of 91% to 94.99%; a threshold of 98.5% will apply to RTPs in a range of 95% to 97.24%; and a threshold of 99% will apply to RTPs in a range of 98.25% to 99.9%.

Figure 9:
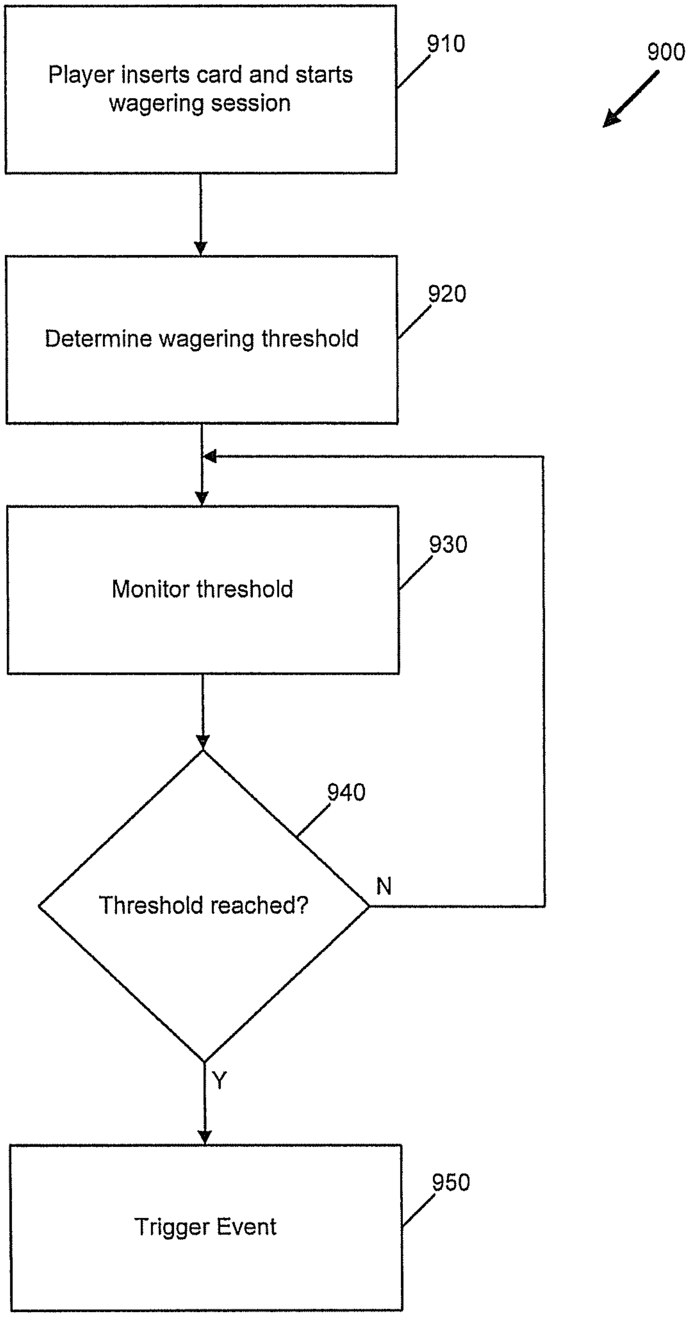
FIG. 9 is a functional block diagram of a gaming device in the form of a standalone gaming machine.

Referring now to FIG. 9, there is shown a flow chart of a method embodiment. In the embodiment, a player inserts a card and starts a wagering session 910. The gaming machine accesses the database through determine a wagering threshold 920. The threshold is then monitored 930 and upon the threshold being reached 940 the event is triggered 950.

A person skilled in the art will appreciate that other techniques can be used to implement the invention. In one variation, the current wagering threshold value can be communicated to a player marketing module of the gaming device at which the player is playing. The player tracking module can then monitor the threshold to minimise network traffic.

Further aspects of the method will be apparent from the above description of the system. It will be appreciated that at least part of the method will be implemented electronically, for example digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

It will be understood to persons skilled in the art of the invention that many modifications may be made without departing from the spirit and scope of the invention. In particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming for use with at least one gaming device operable to play a game in a gaming session, and to communicate with a processor and a non-transitory memory having data indicative of a plurality of gaming session rules, amounts wagered in prior gaming sessions, and a plurality of return-to-player amounts for said at least one gaming device, the method comprising:

defining via said processor a current gaming session based on said data indicative of at least one of the gaming session rules from said non-transitory readable memory;

determining via said processor a wagering threshold to apply to play of said at least one gaming device during the current gaming session based on 1) an average of said amounts wagered in prior gaming sessions, and 2) said return-to-player amounts for said at least one gaming device; and triggering via said processor an event upon reaching the wagering threshold in the current said gaming session via said processor; and wherein said determining via said processor a wagering threshold includes determining via said processor a plurality of different wagering thresholds to apply to a said current gaming session, each said different wagering thresholds being based on a different return-to-player amounts.

2. A method as claimed in claim 1, wherein determining a wagering threshold further includes determining the wagering threshold as a percentage of said average.

3. A method as claimed in claim 1, wherein each of the different wagering thresholds corresponds to a plurality of different return-to-player amounts.

4. A method as claimed in claim 3, wherein each said different wagering thresholds is a different percentage of the amount wagered in a prior gaming session.

5. A method as claimed in claim 1, wherein determining a wagering threshold further includes determining the wagering threshold based on a plurality of prior gaming sessions within a defined period of time.

6. A method as claimed in claim 1, wherein determining a wagering threshold further includes determining the wagering threshold based on a defined number of said prior gaming sessions.

7. A method as claimed in claim 1, wherein determining a wagering threshold further includes determining the wagering threshold from an amount wagered by an individual player.

8. A method as claimed in claim 7, and further comprising obtaining an identity of a player of a current gaming session, and wherein determining a wagering threshold further includes determining the wagering threshold based on the identity.

9. A method as claimed in claim 1, wherein determining a wagering threshold further includes determining the wagering threshold from an amount wagered by a group of players.

10. A method as claimed in claim 1, wherein determining a wagering threshold further includes determining the wagering threshold from an amount wagered on an individual gaming device.

11. A method as claimed in claim 1, wherein determining a wagering threshold further includes determining the wagering threshold from an amount wagered on a group of gaming devices.

12. A method as claimed in claim 1, wherein said triggering an event includes conferring a benefit of said event on a player of the at least one gaming device.

13. A method as claimed in claim 1, further comprising making an award to a player of the at least one gaming device.

14. A method as claimed in claim 1, wherein said triggering an event includes providing information of said event to a player of the at least one gaming device.

15. A gaming system for use with at least one gaming device operable to play a game in a gaming session, the gaming system comprising:

a non-transitory readable memory having data indicative of a plurality of gaming session rules, amounts wagered in prior gaming sessions, and a plurality of return-to-players amounts for said at least one gaming device;

a processor configured to define a current gaming session based on said data indicative of at least one of the gaming session rules from said non-transitory readable memory;

a wagering threshold determiner configured to determine a wagering threshold to apply to play of at least one gaming device during the current said gaming session based on 1) an average of said amount wagered in a plurality of prior gaming sessions, and 2) said return-to-player amounts for said at least one gaming device;

an event controller configured to trigger an event upon the wagering threshold being reached in the current said gaming session; and wherein the wagering threshold determiner is further configured to determine a plurality of different wagering thresholds to apply to a said current gaming session, each said different wagering thresholds being based on a different return-to-player amounts.

16. A gaming system as claimed in claim 15, wherein the wagering threshold determiner is further configured to determine the wagering threshold as a percentage of said average.

17. A gaming system as claimed in claim 15, wherein each of the different wagering thresholds corresponds to a plurality of different return-to-player amounts.

18. A gaming system as claimed in claim 17, wherein said different wagering thresholds is a different percentage of the amount wagered in a prior gaming session.

19. A gaming system as claimed in claim 15, wherein the wagering threshold determiner is further configured to determine the wagering threshold based on a defined period.

20. A gaming system as claimed in claim 15, wherein the wagering threshold determiner is further configured to determine the average amount wagered based on a plurality of prior gaming sessions within a defined period of time.

21. A gaming system as claimed in claim 15, wherein the wagering threshold determiner is further configured to determine the wagering threshold from an amount wagered by an individual player.

22. A gaming system as claimed in claim 15, wherein the wagering threshold determiner is further configured to determine the wagering threshold from an amount wagered by a group of players.

23. A gaming system as claimed in claim 15, wherein the wagering threshold determiner is further configured to determine the wagering threshold from an amount wagered on an individual gaming device.

24. A gaming system as claimed in claim 15, wherein the wagering threshold determiner is further configured to determine the wagering threshold from an amount wagered on a group of gaming devices.

25. A gaming system as claimed in claim 15, wherein the event controller is further configured to confer a benefit of said event on a player of the at least one gaming device.

26. A gaming system as claimed in claim 15, wherein the event controller is further configured to make an award to a player of the at least one gaming device.

27. A gaming system as claimed in claim 15, wherein the event controller is further configured to provide information of said event to a player of the at least one gaming device.

28. A gaming system as claimed in claim 22, wherein the wagering threshold determiner is further configured to determine the wagering threshold from an amount wagered by a group of players.

29. A gaming system as claimed in claim 22, wherein the wagering threshold determiner is further configured to determine the wagering threshold from an amount wagered on an individual gaming device.

30. A gaming system as claimed in claim 22, wherein the wagering threshold determiner is further configured to determine the wagering threshold from an amount wagered on a group of gaming devices.

31. A gaming system as claimed in claim 22, wherein the event controller is further configured to confer a benefit of said event on a player of the at least one gaming device.

32. A gaming system as claimed in claim 22, wherein the event controller is further configured to make an award to a player of the at least one gaming device.

33. A gaming system as claimed in claim 22, wherein the event controller is further configured to provide information of said event to a player of the at least one gaming device.

34. A gaming system for use with at least one gaming device operable to play a game in a gaming session, the gaming system comprising:

a non-transitory readable memory having data indicative of a plurality of gaming session rules, amounts wagered in prior gaming sessions, and a plurality of return-to-players amounts for said at least one gaming device;

a processor configured to define a current gaming session based on said data indicative of at least one of the gaming session rules from said non-transitory readable memory;

a wagering threshold determiner configured to determine a wagering threshold to apply to play of at least one gaming device during the current said gaming session based on 1) an average of said amount wagered in a plurality of prior gaming sessions, and 2) said return-to-player amounts for said at least one gaming device;

an event controller configured to trigger an event upon the wagering threshold being reached in the current said gaming session; and a player tracker configured to obtain an identity of said individual player of said current said gaming session and wherein the wagering threshold determiner is further configured to determine the wagering threshold based on the identity.

* * * * *